United States Patent
Tien

(10) Patent No.: US 6,848,752 B1
(45) Date of Patent: Feb. 1, 2005

(54) STRUCTURE FOR FASTENING SPOKES TO A BICYCLE WHEEL RIM

(76) Inventor: Tseng-Ping Tien, No. 20, Li Fen Rd., Hou Li Hsiang, Taichung Hsien (TW)

( * ) Notice: Subject to any disclaimer, the term of this patent is extended or adjusted under 35 U.S.C. 154(b) by 0 days.

(21) Appl. No.: 10/306,217

(22) Filed: Nov. 29, 2002

(30) Foreign Application Priority Data

Apr. 30, 2002 (CN) ...................................... 91206162 U

(51) Int. Cl.$^7$ .............................................. B60B 21/00
(52) U.S. Cl. ................ 301/95.101; 301/59; 29/894.394
(58) Field of Search ........................... 301/95, 99, 100, 301/102, 104, 58, 59, 54, 55, 67, 73, 74, 95.107, 95.109, 95.104, 95.106, 95.108, 95.101, 95.103, 95.102, 95.105, 95.11; 29/894.33, 894.394, 894.341, 894.342, 894.333

(56) References Cited

U.S. PATENT DOCUMENTS 5,806,935 A * 9/1998 Shermeister ................. 301/58
6,145,937 A * 11/2000 Chen ............................ 301/58
6,378,953 B2 * 4/2002 Mercat et al. ......... 301/95.106
6,588,474 B2 * 7/2003 Passarotto ................... 152/427

FOREIGN PATENT DOCUMENTS

EP          1167078 A1  *  1/2002   ........... B60B/21/06

* cited by examiner

Primary Examiner—Frantz F. Jules
(74) Attorney, Agent, or Firm—Harrison & Egbert

(57) ABSTRACT

A structure is designed to fasten spokes with a bicycle wheel rim and is formed of a fastening hole disposed in an inner side of the bicycle wheel rim, a fitting body having a head, a threaded shank, and a through hole extending through the head and the threaded shank which is engaged with a nut. One end of the spoke is fastened with the bicycle wheel rim by a spoke end fastener which is received in the through hole of the fitting body, with the fitting body being fitted into the fastening hole such that the head of the fitting body is located securely in the fastening hole.

4 Claims, 7 Drawing Sheets

STRUCTURE FOR FASTENING SPOKES TO A BICYCLE WHEEL RIM

BACKGROUND OF THE INVENTION

1. Field of the Invention

The present invention relates generally to the spokes of a bicycle wheel, and more particularly to a structure for fastening the spokes with the bicycle wheel rim.

2. Description of Related Art

As shown in FIG. 1, a bicycle wheel of the prior art comprises a tube-type tire 1, a rim 2, and a plurality of spokes 3 extending between the rim 2 and a hub 4. The tube-type tire 1 contains a separate inner tube to hold the air. Such a prior art bicycle wheel as described above has been replaced by the tubeless tire.

As shown in FIGS. 2 and 3, a bicycle wheel rim 10 of the prior art has an inner side 11 facing the hub. The inner side 11 of the wheel rim 10 is provided with a plurality of threaded holes 12 for fastening spokes 15 in conjunction with a plurality of fittings 13 and end fasteners 16.

As shown in FIG. 3, the fitting 13 is engaged with the threaded hole 12. An outer end of the spoke 15 is fastened with the wheel rim 10 in such a fashion that the outer end of the spoke 15 is fastened with the end fastener 16 via a through hole 14 of the fitting 13.

The spoke fastening structure of the prior art described above with reference to FIGS. 2 and 3 is defective in design in that the threaded holes 12 undermine the structural integrity and strength of the inner side 11 of the rim 10, thereby calling for a structural reinforcement of the inner side 11 of the rim 10 at an additional cost. In addition, the drilling of the threaded hole 12 and the manufacturing of the fitting 13 must be done with precision so as to ensure a sustainable engagement of the fitting 13 with the threaded hole 12.

SUMMARY OF THE INVENTION

The primary objective of the present invention is to provide a spoke fastening structure which is free from the drawbacks of the prior art structure described above.

In keeping with the principle of the present invention, the foregoing objective of the present invention is attained by a spoke fastening structure comprising a plurality of fastening holes disposed in an inner side of a bicycle wheel rim, a plurality of fitting members, and a plurality of spoke end fasteners. The fastening holes are rectangular in shape and have two long sides and two short sides, with the long sides running at right angle to the center line of the circumference of the bicycle wheel rim. The fastening holes are provided with two reinforcing ribs extending along the inner hole edges of the two short sides of the fastening holes. The fitting members are formed of a fitting body and a nut engageable with a threaded shank of the fitting body. The fitting body is located in the fastening hole of the rim such that the fitting body is confined by the two reinforcing ribs, and that the nut is engaged with the threaded shank of the fitting body. The outer end of the spoke is fastened with the end fastener which is disposed in a through hole of the fitting body.

The features and the advantages of the present invention will be more readily understood upon a thoughtful deliberation of the following detailed description of two preferred embodiments of the present invention with reference to the accompanying drawings.

DETAILED DESCRIPTION OF THE INVENTION

Figure 1:
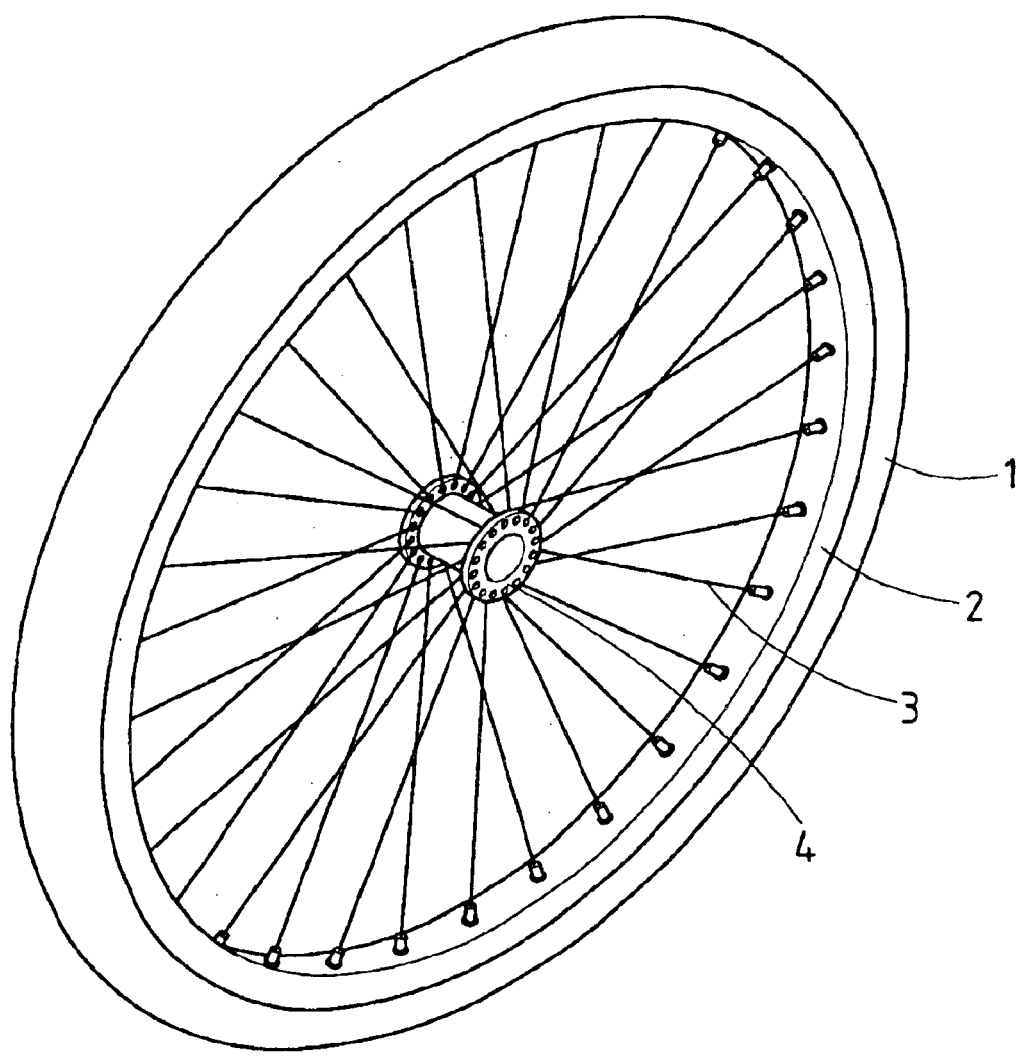
FIG. 1 shows perspective view of a prior art bicycle wheel.
Figure 2:
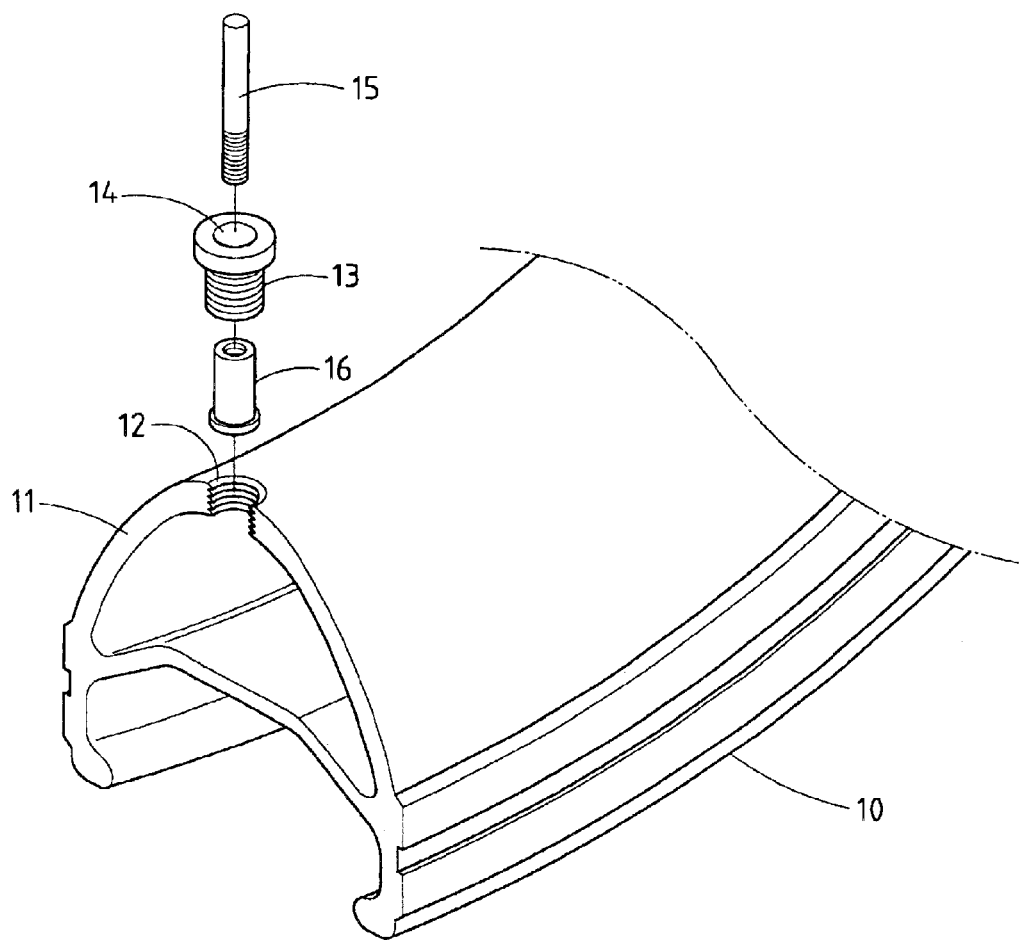
FIG. 2 shows an exploded view of a prior art structure for fastening the bicycle wheel spoke.
Figure 3:
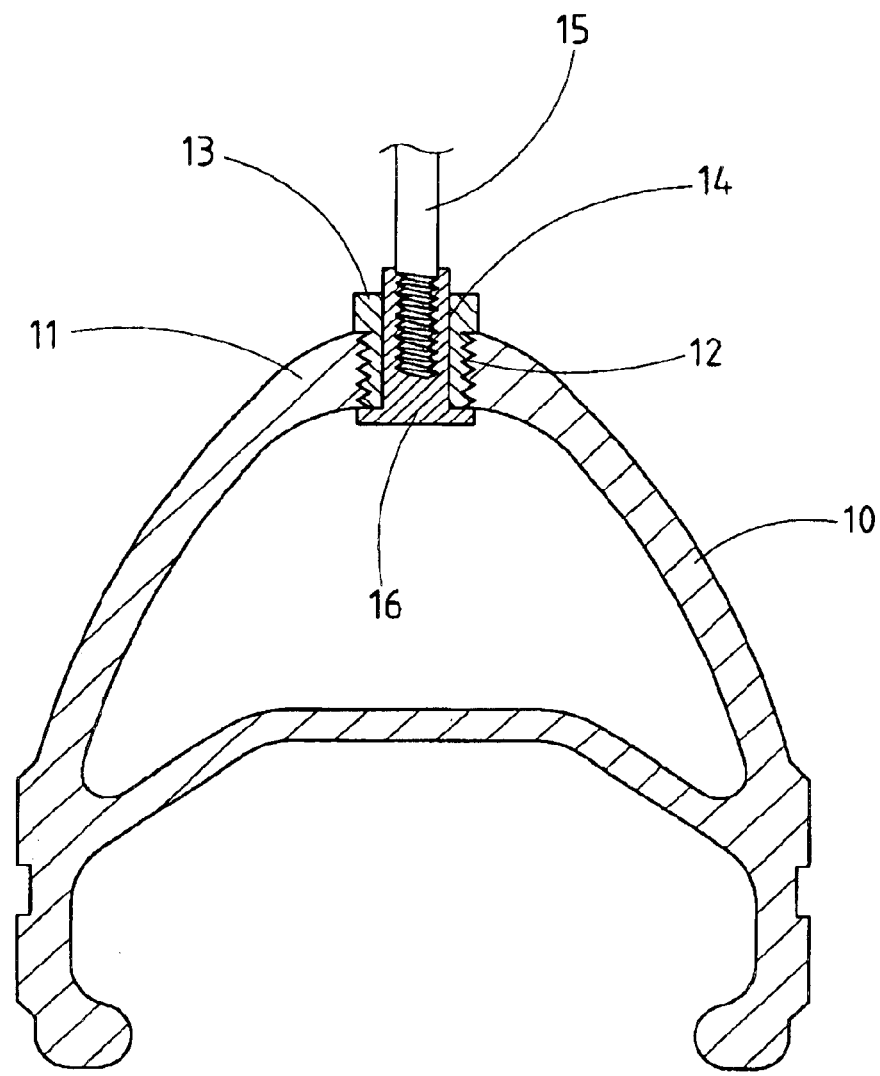
FIG. 3 shows a sectional view of the prior art structure of FIG. 2.
Figure 4:
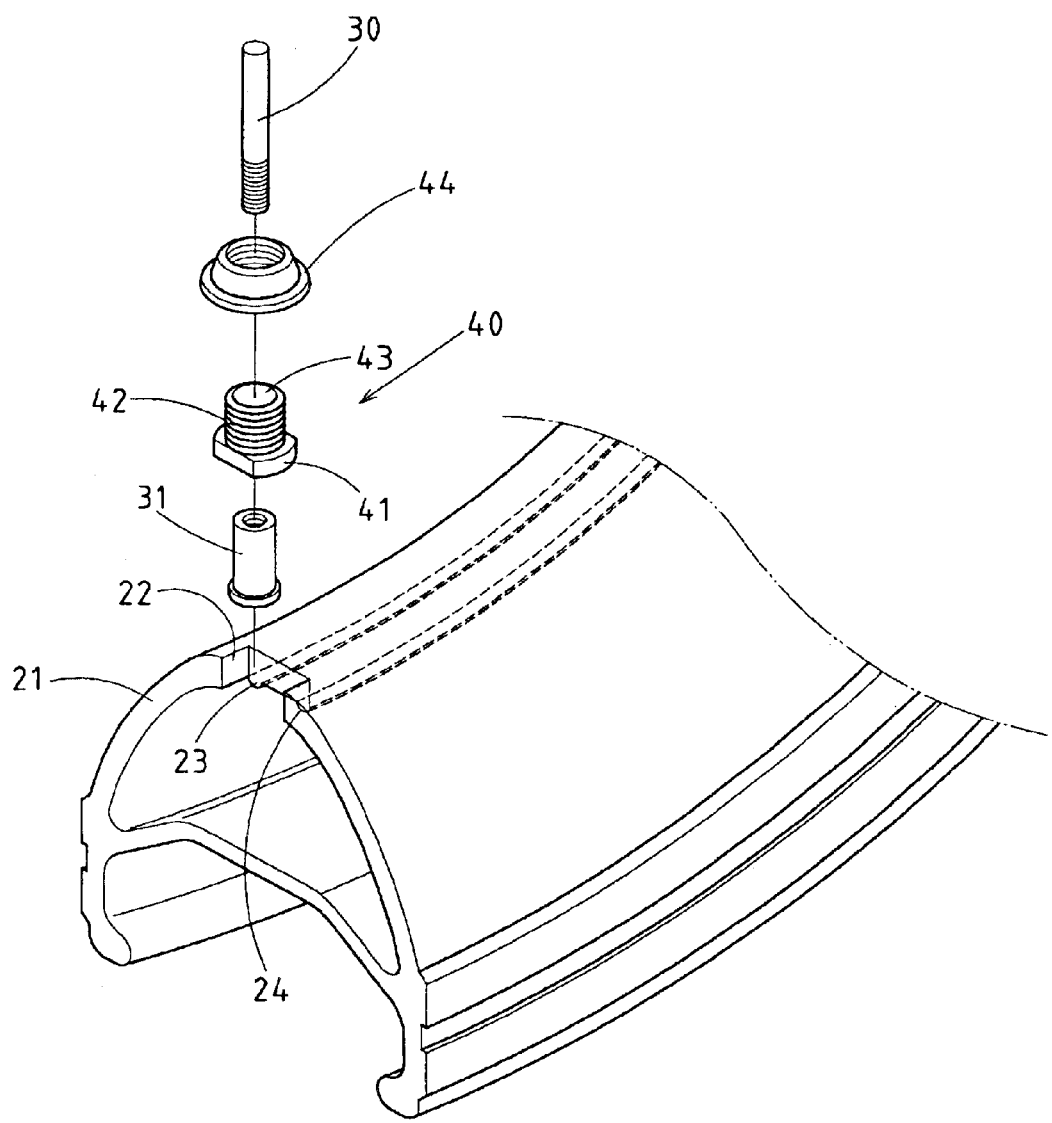
FIG. 4 shows an exploded view of a first preferred embodiment of the present invention.
Figure 5:
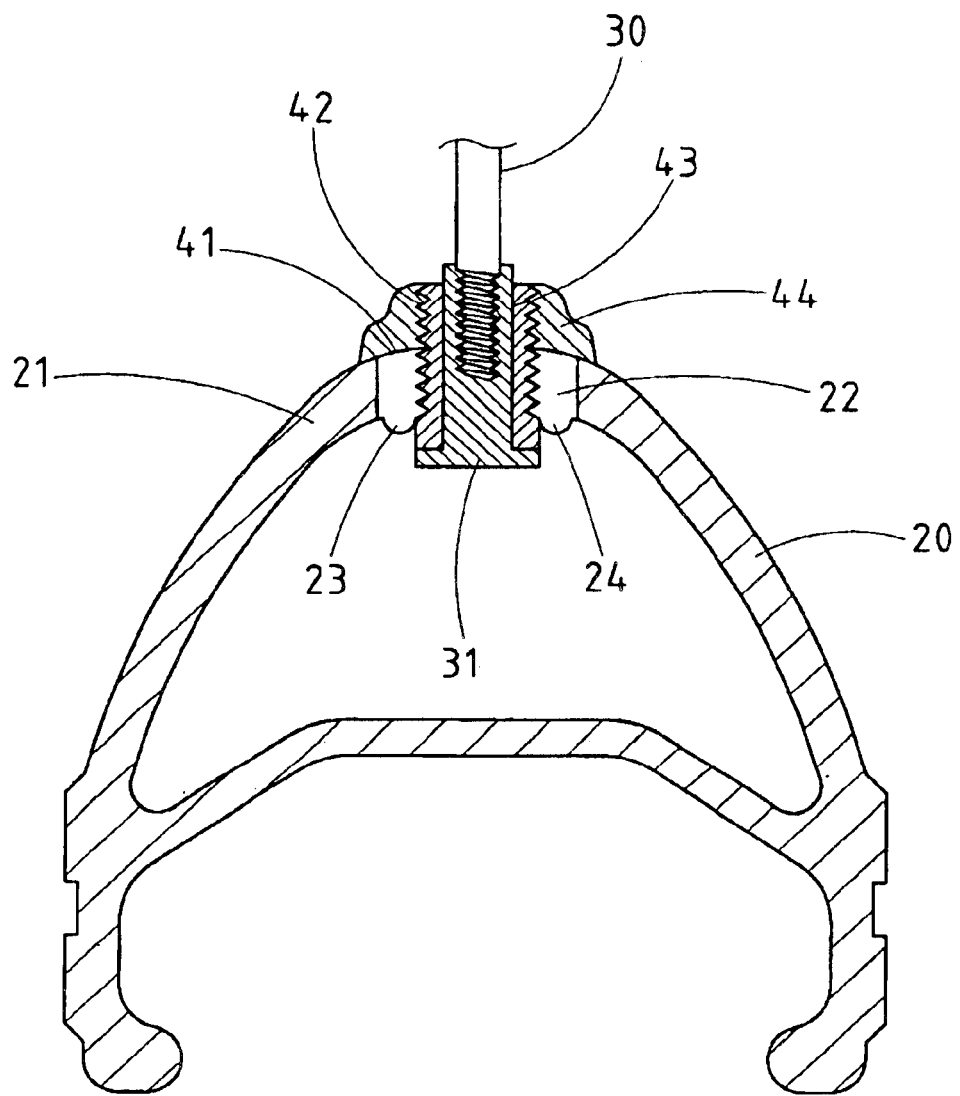
FIG. 5 shows a sectional schematic view of the first preferred embodiment of the present invention.

As shown in FIGS. 4 and 5, a spoke fastening structure embodied in the present invention comprises a fastening hole 22, a spoke end fastener 31, a fitting body 40, and a nut 44.

The fastening hole 22 is formed by punching in an inner side 21 of a bicycle wheel rim 20, with the inner side 21 facing the hub (not shown in the drawings.) The fastening hole 22 is rectangular and has two long sides and two short sides, with the long sides extending at right angle to the center line of the circumference of the bicycle wheel rim 20. The fastening hole 22 is provided with two ribs 23 and 24, which are opposite in location to each other and are extended along the inner hole edges of the two short sides of the fastening hole 22. The ribs 23 and 24 are integrally made with the rim 20 by extrusion.

The fitting body 40 has a head 41, a threaded shank 42, and a through hole 43 extending through the head 41 and the threaded shank 42. The fitting body 40 is disposed in the through hole 22 such that the head 41 is fitted into the through hole 22, and that the nut 44 is engaged with the threaded shank 42 of the fitting body 40, with the nut 44 sealing off the through hole 22 as shown in FIG. 5. A spoke 30 is fastened with the rim 20 such that one end of the spoke 30 is fastened with the spoke end fastener 31 which is disposed in the through hole 43 of the fitting body 40. It must be noted here that the head 41 of the fitting body 40 is confined by the two ribs 23 and 24 of the fastening hole 22.

Figure 6:
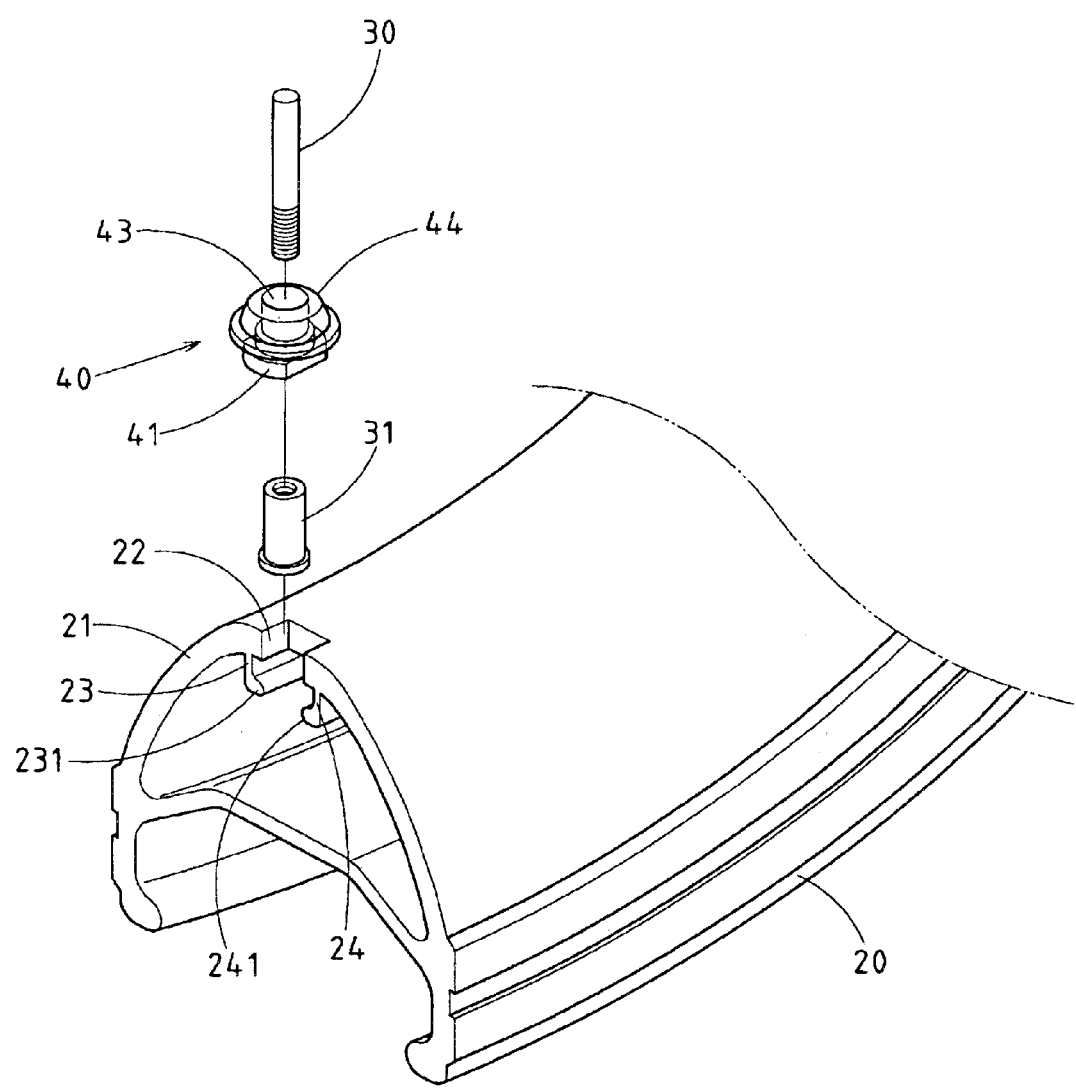
FIG. 6 shows an exploded view of a second preferred embodiment of the present invention.
Figure 7:
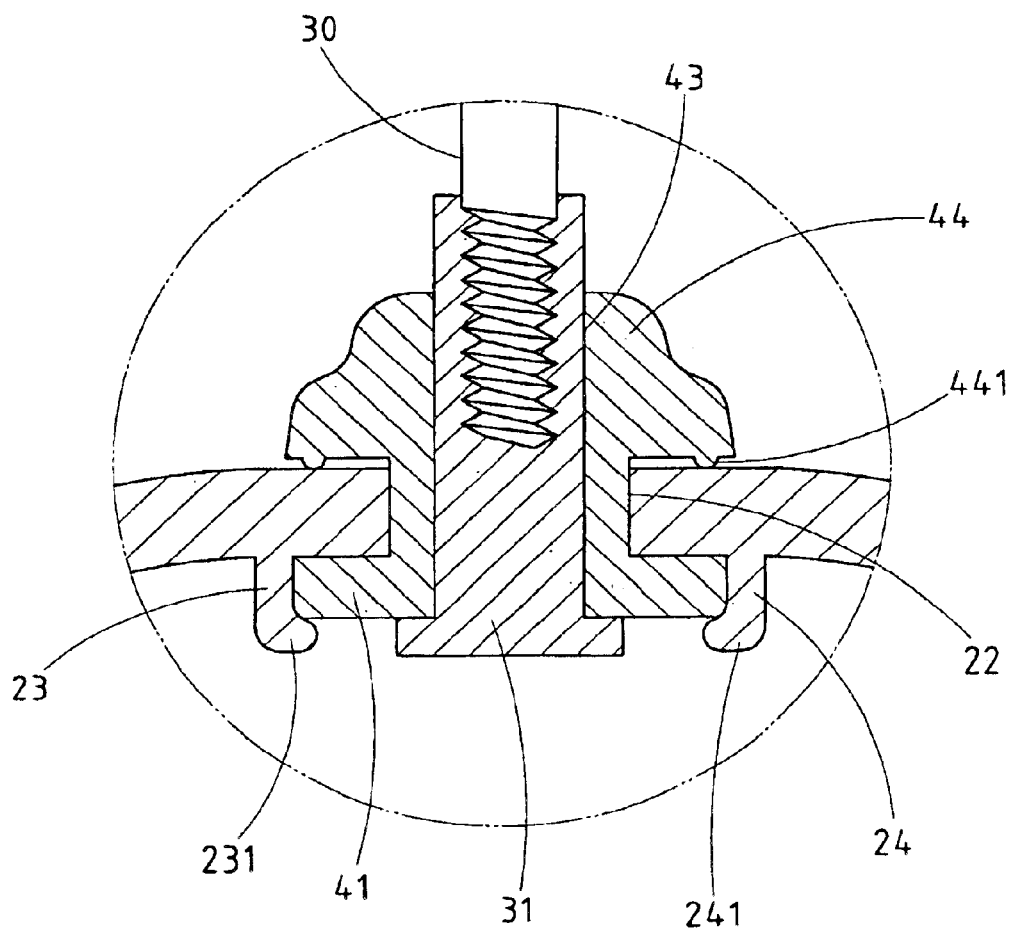
FIG. 7 shows a sectional schematic view of the second preferred embodiment of the present invention.

As shown in FIGS. 6 and 7, a spoke fastening structure of the second preferred embodiment of the present invention is basically similar in construction to that of the first preferred embodiment described above, with the difference being that the nut 44 is integrally made with the fitting body 40, and that the nut 44 and the head 41 of the fitting body 40 are separated by an interval corresponding to a thickness of the inner side 21 of the rim 20, and that the nut 44 is provided in an inner side with two feet 441. In addition, the ribs 23 and 24 are provided respectively with a projection 231, 241. As a result, the ribs 23 and 24 have an L-shaped profile. These two projections 231 and 241 are extended in opposite directions such that they face each other.

As shown in FIG. 7, one end of the spoke 30 is fastened with the spoke end fastener 31 which is received in the through hole 43 of the fitting body 40. In the meantime, the short sides of the rectangular fastening hole 22 are held between the head 41 and the nut 44, with the feet 441 of the nut 44 resting in proximity of the outer hole edge of the fastening hole 22. In addition, the head 41 is supported by the two projections 231 and 241.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A spoke fastening structure comprising:
    a bicycle wheel rim having a fastening hole of rectangular shape disposed in an inner surface of said bicycle wheel rim, said fastening hole having two long sides and two short sides, said two long sides extending at right angles to a center line of a circumference of said bicycle wheel rim;
    a fitting body having a head and a threaded shank extending from said head, said fitting body having a through hole extending through said threaded shank and said head, said fitting body being fitted into said fastening hole of said bicycle wheel rim such that said head is retained in said fastening hole;
    a nut engaged with said threaded shank of said fitting body; and
    a spoke end fastener suitable for fastening onto an end of a spoke, said spoke end fastener being received in said through hole of said fitting body, said fastening hole having a pair of ribs extending respectively along said inner surface aligned with said two short sides of said fastening hole, said pair of ribs retaining said head of said fitting body.

2. The structure of claim 1, said pair of ribs each having a projection extending therefrom such that the projections face each other.

3. The structure of claim 1, said nut having a size suitable for covering said fastening hole at an outer surface of said bicycle wheel rim.

4. A spoke fastening structure comprising:
    a bicycle wheel rim having a fastening hole of rectangular shape disposed in an inner surface of said bicycle wheel rim, said fastening hole having two long sides and two short sides, said two long sides extending at right angles to a center line of a circumference of said bicycle wheel rim;
    a fitting body having a head and a shank extending from said head, said fitting body having a through hole extending through said shank and said head, said fitting body being fitted into said fastening hole of said bicycle wheel rim such that said head is retained in said fastening hole;
    a nut engaged with said shank of said fitting body; and
    a spoke end fastener suitable for fastening onto an end of a spoke, said spoke end fastener being received in said through hole of said fitting body, said nut being integrally formed with said fitting body such that said nut is separated from said head by a distance corresponding to a thickness of said inner surface of said bicycle wheel rim, said two short sides of said fastening hole being sandwiched between said nut and said head of said fitting body.

* * * * *